(12) United States Patent
Bartels et al.

(10) Patent No.: US 9,989,367 B2
(45) Date of Patent: Jun. 5, 2018

(54) TECHNIQUE FOR PROVIDING TRAVEL INFORMATION

(71) Applicant: ELEKTROBIT AUTOMOTIVE GmbH, Erlangen (DE)

(72) Inventors: Florian Bartels, Nuremberg (DE); Thomas Mayrhofer, Fuerth (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 0 days. days.

(21) Appl. No.: 14/483,406

(22) Filed: Sep. 11, 2014

(65) Prior Publication Data

US 2015/0081216 A1 Mar. 19, 2015

(30) Foreign Application Priority Data

Sep. 13, 2013 (EP) ..................................... 13004488

(51) Int. Cl.
*G01C 21/26* (2006.01)
*H04W 4/029* (2018.01)
(Continued)

(52) U.S. Cl.
CPC ............. *G01C 21/26* (2013.01); *G01C 21/32* (2013.01); *G01C 21/3697* (2013.01); *H04W 4/029* (2018.02); *G01C 21/3641* (2013.01)

(58) Field of Classification Search
CPC .... G01C 21/26; G01C 21/32; G01C 21/3697; G01C 21/3641; H04W 4/028; H04W 4/029

(Continued)

(56) References Cited

U.S. PATENT DOCUMENTS 6,643,584 B1 * 11/2003 Ikeuchi ................. G01C 21/32
340/988
2002/0029108 A1 * 3/2002 Liu ........................ H04W 24/00
701/410

(Continued)

FOREIGN PATENT DOCUMENTS

CN 101063616 A 10/2007
CN 102192749 A 9/2011
(Continued)

OTHER PUBLICATIONS

Yoshioka et al., JP2006209106, Oct. 2006 (whole document) (machine translation).*

(Continued)

*Primary Examiner* — Courtney D Heinle
(74) *Attorney, Agent, or Firm* — Westerman, Hattori, Daniels & Adrian, LLP (57) ABSTRACT

A technique is described for providing travel information for route segments repeatedly covered by a vehicle, wherein the travel information is indicative of map data changes extractable from map data update information. A method aspect comprises the steps of determining whether the vehicle is likely to travel along repeatedly covered route segments; selecting map data changes that are associated with the repeatedly covered route segments the vehicle is likely to travel; and generating travel information on basis of the selected map data changes and providing the travel information to a driver. Provided are also a computer program product and a device implementing the described method.

17 Claims, 4 Drawing Sheets

(51) Int. Cl.
*G01C 21/32* (2006.01)
*G01C 21/36* (2006.01)

(58) Field of Classification Search
USPC .......................................................... 701/532
See application file for complete search history.

(56) References Cited

U.S. PATENT DOCUMENTS

| | | | | |
|---|---|---|---|---|
| 2002/0082773 | A1* | 6/2002 | Ikeuchi | G01C 21/32 |
| | | | | 701/410 |
| 2006/0058952 | A1* | 3/2006 | Cooper | G01C 21/26 |
| | | | | 701/532 |
| 2006/0080029 | A1* | 4/2006 | Kodani | G01C 21/32 |
| | | | | 701/420 |
| 2006/0080030 | A1* | 4/2006 | Okude | G01C 21/32 |
| | | | | 701/452 |
| 2006/0184316 | A1* | 8/2006 | Hultin | G01C 21/32 |
| | | | | 701/532 |
| 2007/0073477 | A1* | 3/2007 | Krumm | G01C 21/3617 |
| | | | | 701/423 |
| 2007/0198184 | A1* | 8/2007 | Yoshioka | G01C 21/32 |
| | | | | 701/426 |
| 2008/0208451 | A1* | 8/2008 | Minami | G01C 21/3484 |
| | | | | 701/533 |
| 2009/0177390 | A1* | 7/2009 | Mikusiak | G01C 21/32 |
| | | | | 701/414 |
| 2009/0177677 | A1* | 7/2009 | Mikusiak | G01C 21/32 |
| 2011/0060519 | A1* | 3/2011 | Hunter | G01C 21/26 |
| | | | | 701/532 |
| 2011/0098922 | A1 | 4/2011 | Ibrahim | |
| 2011/0112762 | A1* | 5/2011 | Gruijters | G01C 21/32 |
| | | | | 701/532 |
| 2012/0143886 | A1 | 6/2012 | Okude et al. | |
| 2012/0150430 | A1 | 6/2012 | French et al. | |
| 2013/0030697 | A1* | 1/2013 | Bartels | G01C 21/30 |
| | | | | 701/446 |
| 2013/0297204 | A1* | 11/2013 | Bartels | G01C 21/165 |
| | | | | 701/495 |
| 2013/0304382 | A1* | 11/2013 | Nomoto | G01C 21/26 |
| | | | | 701/533 |
| 2015/0066366 | A1* | 3/2015 | Pang | G01C 21/32 |
| | | | | 701/532 |
| 2015/0148064 | A1* | 5/2015 | Tsuda | G01C 21/32 |
| | | | | 455/456.1 |

FOREIGN PATENT DOCUMENTS

| | | |
|---|---|---|
| CN | 102538810 A | 7/2012 |
| DE | 10233376 A1 | 2/2004 |
| DE | 10 2007 045 082 A1 | 4/2009 |
| DE | 10 2008 059 280 A1 | 6/2010 |
| DE | 10 2010 042 873 A1 | 4/2011 |
| EP | 1 666 845 A2 | 6/2006 |
| JP | 08-095488 A | 4/1996 |
| JP | 2003-294461 A | 10/2003 |
| JP | 2004-108777 A | 4/2004 |
| JP | 2006-209106 A | 8/2006 |
| JP | 2006-313085 A | 11/2006 |
| JP | 2011-107025 A | 6/2011 |

OTHER PUBLICATIONS

Mogi et al., JP2004108777, Published Apr. 8, 2004 (Machine Translation).*
Ito, JP2003296348, Oct. 17, 2003 (machine translation).*
Office Action dated Jul. 21, 2015, issued in counterpart Japanese Patent Application No. 2014-184119 (w/ English translation) (8 pages).
Office Action dated Nov. 20, 2015, issued in counterpart EP Patent Application No. 13004488.6 (6 pages).
Office Action dated May 30, 2017, issued in counterpart Japanese Patent Application No. 2016-134988, with English tanslation. (6 pages).

* cited by examiner

TECHNIQUE FOR PROVIDING TRAVEL INFORMATION

TECHNICAL FIELD

The present disclosure generally relates to navigation-related aspects. In particular, the disclosure relates to a technique for providing travel information associated with route segments that are repeatedly covered by a vehicle.

BACKGROUND

Modern navigation devices (including smart phones and tablet PCs) calculate routes between geographic positions, like a route start position, route end point and optional intermediate positions. Based on the geographic positions and on provided digitized map data, the navigation devices calculate and output to the user a recommended route. In addition, navigation devices comprise route guidance functionalities designed to output appropriate maneuver instructions for upcoming maneuvers when travelling along the pre-calculated route. Instructions or warnings comprising information on speed limits, allowed travel directions (one-way or both directions), potential traffic congestions, existence of roadworks, etc. may be also output. Other information may be directed to upcoming points of interest, or POIs. All this information is based on digitized map data usually stored in a storage unit of the navigation device or provided online by a map data supplier.

In many situations, the user does not need route calculation or route guidance to a repeatedly visited destination, since the user knows every detail of the route to be travelled. Examples for such routes are, for instance, the daily way to work, the return to home, the way to frequently visited friends or clients, the way to the next supermarket or to the airport, and so on. For such frequently travelled routes the user generally knows dangerous route passages, the position of traffic lights and speed limitation signs, dangerous curves and junctions, the detailed characteristic of the junctions to be taken and how to turn on the junctions etc. For this reason, the user does not desire route guidance and, consequently, the user does not enter destination information, so that no route guidance is active.

On the other hand, road networks are continuously subjected to changes. For instance, road specific rules, like speed limits, the direction of one-way streets, the right of way or other accessibility condition are frequently changed. In other cases roadworks are set up or are terminated, the geometry of route segments or junctions has been changed or POIs associated with roads have been newly installed or closed. Nowadays such modification can be efficiently encountered by frequently updating the map database of the navigation device. For instance, navigation database formats, like the Navigation Data Standard, or NDS, format provide incremental database updates, in which small data portions rather than the whole database can be individually updated. In NDS an incremental update of map data on tile-basis (a tile represents a local geographic area of pre-determined dimensions) is supported. As such, it can be expected that changes (even temporary changes) in the road network are quickly recorded and incorporated in the data set so that route guidance and route calculation are substantially performed on up-to-date navigation data.

However, in case the user is driving a frequently travelled road without route guidance support, the user will not be informed by the navigation device on possible changes. The user will also not immediately notice performed changes on the travelled route. In addition, since the user is readily familiar with the route, the user often does not drive as carefully as he or she drives on unknown routes. Thus, also minor changes, such as the installation of an additional traffic light or of a speed limit sign, might surprise the driver and might lead to dangerous situations (for instance, when the driver is performing an abrupt brake maneuver), since the user does not expect such changes when travelling along the route.

SUMMARY

It is therefore an object to provide a technique that actively supports the user in overcoming unknown dangerous traffic situations when travelling along a route.

According to one aspect, a computer-implemented method for providing travel information for route segments repeatedly covered by a vehicle is provided, wherein the travel information is indicative of map data changes extractable from map data update information. The method comprises the steps of determining whether the vehicle is likely to travel along repeatedly covered route segments; selecting map data changes that are associated with the repeatedly covered route segments the vehicle is likely to travel; and generating travel information on basis of the selected map data changes and providing the travel information to a driver.

The determining step, the map data change selection step and the travel information step may be performed (in a navigation device or device which implements navigation functionalities) during driving and while a route guidance is inactive. That means the above-mentioned method steps may also be performed when no route calculation has been desired by the user, by, for instance, inputting a destination for calculating a (recommended) route from a current position to the inputted destination. As a consequence, no route guidance is activated by providing guidance instructions for following the calculated route course. According to one implementation, the above described method steps may be performed upon detecting that the vehicle is moving. A movement of the vehicle can be simply detected from position sensors or other available sensors detecting a motion state of the vehicle (e.g., at least one of velocity, acceleration and heading sensor as installed in modern vehicles).

According to one variant the method may further comprise the steps of receiving map data update information, and extracting map data changes from the received update information by comparing the received map data update information against map data information that is to be updated. Based on the comparison map data changes may be extracted that are indicative of how the map data are changing from a current map data version to an updated map data version. In other words, the map data changes are indicative of the changes in attribute data stored in the map database in association with route segments (or route links) and route junctions (or route nodes).

The extracting step may be performed in the navigation device (or any other user device implementing navigation functionalities). For this purpose, the navigation device may be in communicative connection with a map data update provider for receiving map data update information. The received map data may then be compared with the current map data before (fully or partly) replacing the current (i.e., old) map data in the database of the navigation device with the updated data. Replacing of the current map data may mean that the current map data to be updated are overwritten by the updated map data in the map database. Further, the extracted map data changes may be stored in a separate database that is separated from the map database in which the map data are organized. According to another variant, the map data changes may be organized and stored in a separate substructure of the map database.

Alternatively, or in addition thereto, the extracting step may be performed on a provider side (in the following denoted as map data change provider). In this context, a map data change provider system compares the new data with the current data and generates map data changes indicative of how the map data attributes are changing from a current map data version to an updated map data version. The extracted map data changes may be organized and stored in a separate database in the map data change provider system. The at least one of the updated map data and the extracted map data changes can then be received from that system via an online connection (air interface) of the navigation device. The extracted map data changes may be retrieved on demand (in real time), while the method is carried out.

The map data changes may be extracted in accordance with one or more filtering options. According to one variant, map data updates representing only map data corrections or map data patches for correcting errors or inaccurate map data digitalization (for instance inaccurate digitalization of road courses, road junctions or junction connections or erroneous provisioning of road attributes, traffic rules in previous map data versions) can be filtered out. Thus, only map data changes reflecting recent changes in the real road network are considered when extracting map data changes.

Extracted map data changes may be provided with a validity date indicating the temporal validity of a provided change. In this context, the validity date may comprise at least information on the effective start time of changes and an expected duration of the changes (i.e. expiry date). The effective start time may be the time in which a change in the traffic rules takes effect for the real road network. Database updates usually implement map data changes reflecting changes already performed for the road network so that the start time lies in the past. However, for certain events, like a set up of roadworks and associated therewith expected changes in traffic rules, the start time may also lie in the future.

The step of selecting map data changes may comprise retrieving map data from the database of the device or from a map data change provider. Only those map data changes may be retrieved that are identified to correspond to route segments (and junctions) which are determined to be probably covered by the user. During retrieving a further filtering of map data changes according to their validity dates may be performed. Extracted map data changes may be filtered out in the event the validity date is expired. In the same way, map data changes that may be directed to future changes may be filtered out as long as the changes do not come into effect.

In addition, or alternatively thereto, map data changes may be provided with an extraction date. The extraction date is indicative of the date when the map data changes have been extracted from update information. The extraction date may be used as additional filter in the selecting step. In case the extraction date is older than a predetermined point of time (for instance, the extraction date is several weeks or months old), map data changes will not be considered any more as it is expected that the performed changes are meanwhile readily known by the user.

The generation of travel information for upcoming route segments may be based on the selected map data changes associated with predicted upcoming route segments. Based on the selected data instructions or (early) warnings may be generated. The instructions or warnings point to changes in the traffic rules. The instructions or warnings associated with a route segment may be provided immediately prior the user is passing the corresponding route segment. Alternatively, the warnings may be provided as early as possible after determining (with a certain probability) that the user is likely to travel along a specific frequently travelled route. By early warning the user is immediately informed on possible changes along the route such that the user can early decide to use the same route or to choose another route. The provision of the warnings or instructions may be performed optically, acoustically, haptically or by combined optic and acoustic outputs.

According to another variant the output may be suppressed if it has been recognized that the warnings or instructions has been already outputted once or several times so that the user is already sufficiently informed thereon.

The map data changes may comprise at least one of traffic rules, changed accessibility conditions of route segments, changed accessibility conditions of route nodes, changed trafficability conditions of route segments (e.g., stopped, hampered or restored trafficability of a route segment) and changed POI data. Traffic rules may comprise at least one of speed limits, recommended average speeds, allowed travel directions and rights of way.

The (changed) trafficability conditions may be indicative of the trafficability or of changes in the trafficability which are valid for a longer (or predetermined) period of a time. Such a period of time may comprise a period of several days, one or more weeks, a month, or even longer periods.

Furthermore, a computer program product with program code portions is provided for performing the method when the computer program product is executed on a computer device (for instance, a navigation device). For this purpose, the computer program product may be stored on a computer-readable recording medium (e.g., a memory card or a read-only memory.

In addition, a device is provided that is adapted to provide travel information for route segments repeatedly covered by a vehicle, wherein the travel information is indicative of map data changes extractable from map data update information. The device comprises a determining unit adapted to determine that the vehicle is likely to travel along repeatedly covered route segments; a selecting unit adapted to select map data changes that are associated with the repeatedly covered route segments the vehicle is likely to travel; and a generating unit adapted to generate travel information on basis of the selected map data changes and to provide the travel information to a driver. The travel information may be provided as instructions during travelling or early warnings as soon as the route segments the user is likely to travel are identified or a combination of both depending on the information to be output.

The device may further comprise a storage unit comprising at least one of a map database in which updatable map data are stored and a database in which extracted map data changes are stored. According to one variant the map database may comprise both database structures.

The device may further comprise an extraction unit adapted to extract map data changes from received updated map data by comparing the updated map data against map data information that is to be updated.

Still further, the device may comprise an output unit adapted to output (early) warnings or instructions or a combination thereof in an acoustic or optical way.

Further, a navigation device comprising the above described device is also presented.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented herein. It will be apparent to one skilled in the art that this technique may be practised in other embodiments that depart from these specific details. For example, the embodiments will primarily be described in the context of a vehicle-based navigation device; however, this does not rule out the use of the present technique in conjunction with smart phones, tablet PCs, personal digital assistants (PDAs) or other devices implementing navigation applications for use in vehicle navigation, pedestrian navigation or bicycle rider navigation.

Moreover, those skilled in the art will appreciate that the services, functions and steps explained herein may be implemented using software functioning in conjunction with a programmed microprocessor, using an Application Specific Integrated Circuit (ASIC), a Digital Signal Processor (DSP) or general purpose computer. It will also be appreciated that while the following embodiments are primarily described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
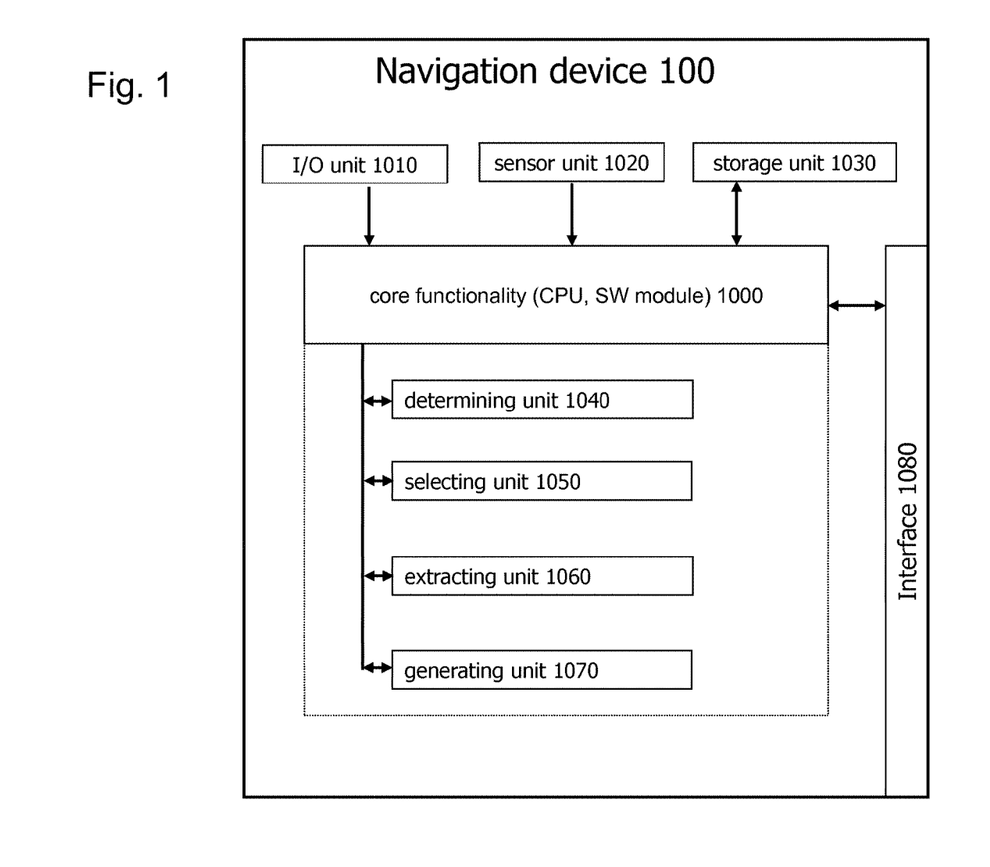
FIG. 1 illustrates an apparatus according to an exemplary embodiment of the present invention.

FIG. 1 shows, in the form of a block diagram, an embodiment of a device 100 configured to provide travel information for route segments frequently travelled by a vehicle, wherein the information is indicative of map data changes. The travel information is also provided, when no predetermined route is calculated and no route guidance functionality is active. As will be described in detail in the following, the travel information may be provided as (early) warning information when the user is going to repeatedly travel a specific route. In addition, or alternatively thereto, parts of travel information may be also provided in form of instructions immediately before encountering a specific maneuver or hurdle on the route.

The device 100 comprises a core functionality 1000, an input and output unit 1010 (denoted as I/O unit in FIG. 1), a sensor unit 1020, a storage unit 1030, a determining unit 1040, a selecting unit 1050, an extracting unit 1060, a generating unit 1070 and at least one communications interface 1080. The device 100 may be part of a navigation device, a mobile telephone, a smart phone, a Personal Digital Assistant, or PDA, or electronic devices implementing navigation functionalities. The device 100 may be fixedly installed in a vehicle (onboard device) or designed as a portable unit (Personal Navigation Device, or PND).

The core functionality 1000 is designed in the form of a central processing unit (CPU), a microprocessor, or in the form of a software module (SW module). The core functionality is the heart of the device 1000. It is in communicative connection with the input and output unit 1010, the sensing unit 1020, the storage unit 1030, the determining unit 1040, the selecting unit 1050, the extracting unit 1060, the generating unit 1070 and with the at least one communications interface 1080. The core functionality manages the data streams between the different units. In addition, the determining unit 1040, the selecting unit 1050, the extracting unit 1060 and the generating unit 1070 may be part of the core functionality 1000 by, for instance, being designed as software sub-modules. Alternatively, the units 1040 to 1070 may be designed as separate hardware units being in communicative connection with the core functionality 1000.

The at least one communications interface 1080 is configured to set up online connections with map data providers and other navigation devices. Via the at least one communications interface 1080 the device 100 can exchange (i.e., receive and send) map data with the environment. For instance, map data updates or map data changes provided by update providers are received via the interface 1080. For this purposes, the interface 1080 may be realized as a mixed hardware and software interface.

The input and output unit 1010 comprises an input unit and an output unit. The input unit is designed to receive a variety of user inputs. It may comprise at least one of a (touch-sensitive) display, keyboard, mouse, joystick, and a voice recognition system for speech inputs. The output unit is designed to output at least one of map data information, visualized maps, maneuver instructions and warnings. It may comprise at least one of a loud speaker and a (touch-sensitive) screen.

The sensor unit 1020 may comprise at least one position sensor for detecting the current position of the user. The position sensor may be realized as absolute position sensor detecting a geographic latitude and longitude information reflecting the current geographic position of the user relative to a global or local geographic coordinate system. Such an absolute position sensor may detect signals from the GPS, Galileo, Glonass or other global positioning systems. The sensor unit 1020 may also comprise relative position sensors, like an odometer and gyroscope. Still further, the device may comprise a time sensor and further sensors capable of detecting at least one of a current velocity, a current acceleration and other motion conditions that can be used for drawing conclusions on the current position and the upcoming route segments the driver is going to travel. Since most of the above mentioned sensors are already implemented in vehicles and used for other vehicle functions (such as brake assistants, electronic motor control, etc.) it is also conceivable that the device 100 uses these data. In such a case, the corresponding sensor data are received via the at least one interface 1080.

The storage unit 1030 is configured to store map data in digitized form. The map data may be organized and structured according to a pre-defined data format in at least one database. For instance, the map data can be organized in accordance with the Navigation Data Standard, or NDS, format or assume any other format. The map data stored in the at least one database 1030 comprises at least routing data in form of route segment data (also denoted as route link data) and associated road geometry data representing geometry details of route segments. Depending on the map database supplier, the route segment data may comprise a variety of attributes describing, for instance, traffic rules (like speed limits, rights of way, travel directions, recommended average speed), road type, road classification, lane information, etc. of the route segments. The routing data further comprise route node data indicative of road junctions of a road network.

The storage unit 1030 is further configured to store map data changes indicative of changes in the attribute data of the route segment data and route node data between updated map data and the stored map data to be updated. The map data changes are organized and stored in a separate database, called map data change database 372 hereinafter.

Still further, the storage unit 1030 is configured to store sensor data records of previous trips (for instance, in form of log files). The sensor data records may provide a detailed travel history of the previously travelled routes. Alternatively, or in addition thereto, the storage unit 1030 may be configured to store driving profiles associated with frequently travelled routes. Driving profiles may comprise velocity profiles and/or acceleration profiles which can be easily derived from recorded velocity sensor data. The sensor data records and driving profiles may be also organized and stored in a separate database (sensor data database 370) in the storage unit 1030.

The functioning of the determining unit 1040, the selecting unit 1050, the extracting unit 1060 and the generating unit 1070 will be described in more detail in conjunction with FIGS. 2 to 4.

Figure 2:
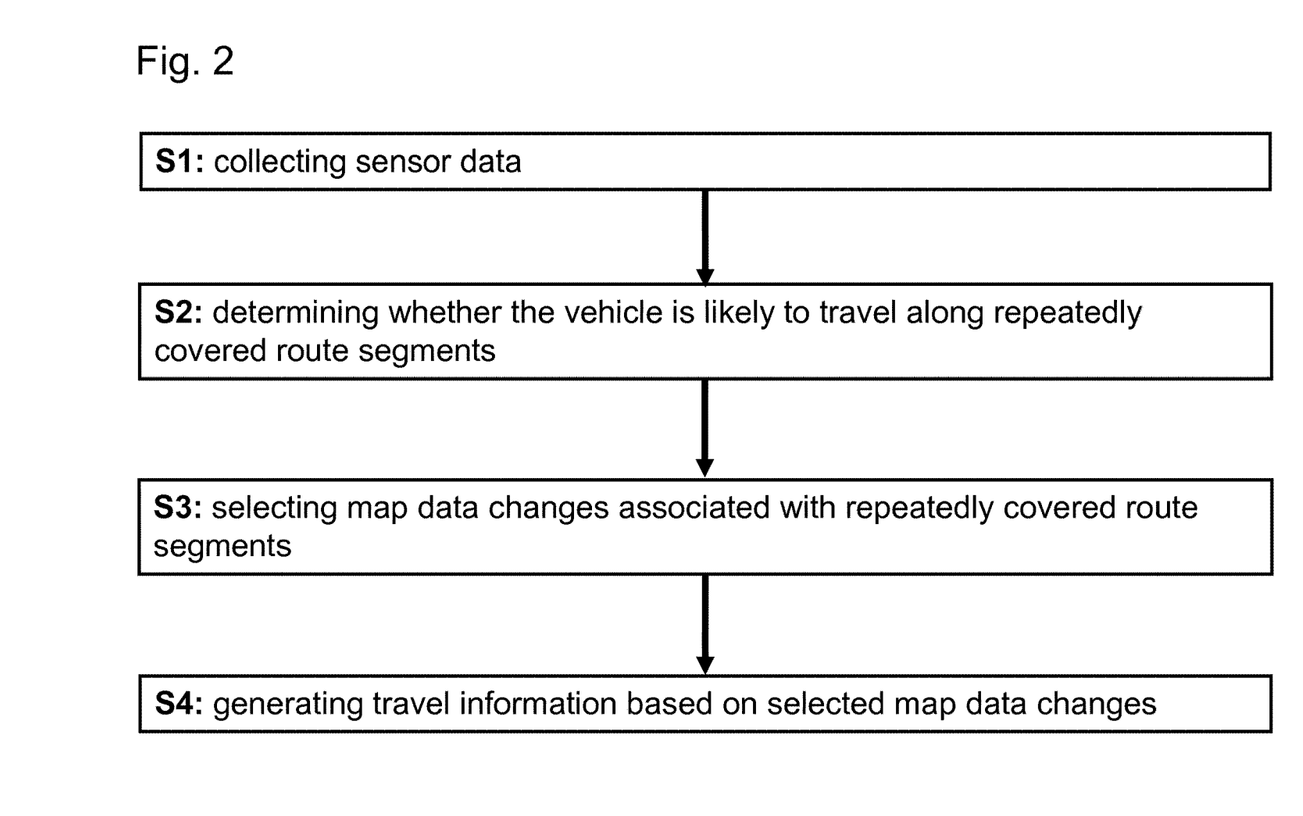
FIG. 2 illustrates a first flow diagram representing a method according to an exemplary embodiment of the present invention.

The flow diagram in FIG. 2 illustrates an embodiment of a method for providing travel information for repeatedly covered route segments, which method is explained exemplarily on the basis of the device 100 represented in FIG. 1. As already mentioned above the method can be performed while a route guidance functionality is inactive or interrupted.

In a first step S1 sensor data 360 are collected by the sensor unit 1020 in order to determine the current position of a user vehicle. The recorded and evaluated sensor data are also used for predicting route segments the user is likely to travel. In this context, at least position sensor data 360 of a position sensor is recorded (for instance, absolute position sensor, like GPS, dead reckoning sensors). In addition, motion sensor data 360 of motion sensors and a time from the GPS signal or from a time sensor can be recorded. From the position sensor the movement of the absolute position of the user is derivable. In addition, speed and acceleration information can be obtained from motion sensors. Upon detecting a vehicle motion the sensor data are continuously recorded and continuously fed to the determining unit 1040 during travel.

In a subsequent second step S2, the determining unit 1040 is configured to determine on basis of the continuously received sensor data whether the vehicle is likely to travel along repeatedly covered route segments. For this purpose, the determining unit 1040 compares the recorded position data (and time data, if available) with stored sensor data records of previously travelled routes. In case motion sensor data, like speed data, acceleration data, are also available, the determining unit 1040 may additionally compare these data with the stored sensor data records or stored driving profiles. The determining unit 1040 searches for similarities and congruities between the compared data and selects that sensor data record (associated with a previously travelled route) showing the highest accordance with the already recorded data.

Further, the determining unit 1040 compares the sensor data set of the selected sensor data record with stored routing data in the map database. The routing data comprise geographic position information, speed information, maneuver information and other information that can be used for evaluating the recorded sensor data sequence. Based on the comparison those route segments (or route segment combinations) are selected for a route prediction which best fit to the travel history given by the sensor data records.

Based on the predicted route segments, the selecting unit 1050 selects in a subsequent third step S3 map data change data from the map data change database 372. In case the device 100 stores map data changes locally in its storage unit 1030, the selecting unit 1050 performs a local search in the storage unit 1030 for identifying any map data changes that are assignable to the predicted route segments. Further, the selecting unit 1050 retrieves the assignable map data changes and hands over the retrieved data to the generating unit 1070. Alternatively, the selecting unit 1050 may retrieve map data changes associated with the identified route segments from an external map data change provider via an online connection.

Based on the retrieved map data changes the generating unit 1070 generates in a sub-sequent fourth step S4 travel information and outputs the generated travel information in form of acoustic or optic outputs or in form of combined acoustic and optic outputs. The outputs may comprise warnings which are immediately output after a route has been predicted. Such early warnings may comprise information about the trafficability of route segments. For instance, the warning may comprise an acoustic warning in the form of "The road X between intersections D and E is closed for public traffic from 9 a.m. to 5 p.m." in order to indicate that a road portion of the route is closed. Warnings may also be outputted for changes that take effect in the future, like "Starting from next week, road X will be closed for two months due to roadworks", provided that the map data changes comprise such temporal information (e.g., validity information).

In addition thereto, or alternatively, the output may also comprise instructions which are outputted during travel in good time before reaching the route portion on which the change took effect. For instance, when reaching an upcoming maneuver in which the user usually expects a left turn into a one-way street, the user may be provided with an instruction, like "Please note the one-way street to the left has a switched direction", when getting near to the maneuver point. The user is then aware that he is not allowed anymore to turn left at the corresponding street and has to find another way. It is clear that the claimed method can also generate and output other warnings and instructions that deviate from the above-presented warnings and instructions. The above-presented warning and instruction examples are only provided for purpose of explanation but not of limitation.

Figure 3:
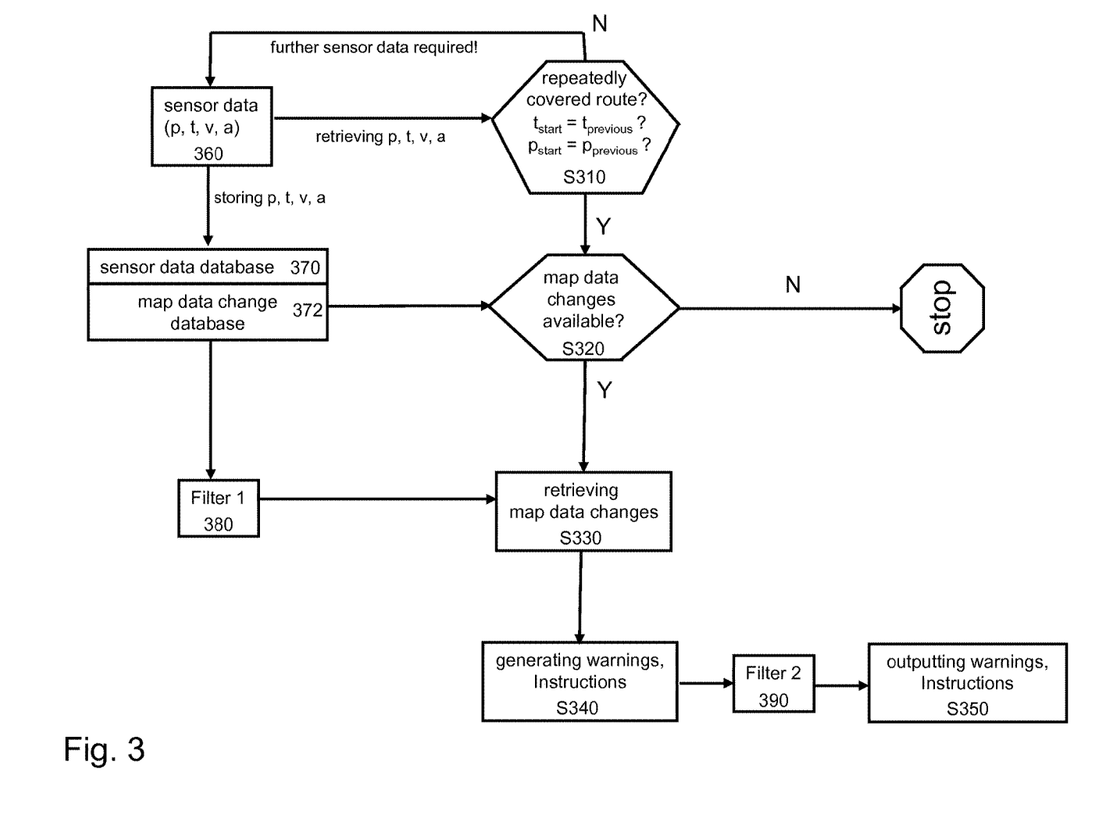
FIG. 3 illustrates a second flow diagram representing a method according to a further exemplary embodiment of the present invention.

FIG. 3 shows an implementation embodiment of the method described in conjunction with FIG. 2.

The determining unit 1040 continuously retrieves and evaluates sensor data 360 provided by the sensor unit 1020 upon detecting that the user is intending to drive (S310). A user intention to drive may be derived by detecting an initial vehicle movement or by detecting that the vehicle engine has been started. In addition, the sensor data 360 is continuously recorded and stored in the sensor data database 370 of the storage unit 1030. In the same way, the recording of sensor data may be stopped when detecting that the vehicle has reached a destination (for instance, by detecting a standing still event of the vehicle over a longer time period or by detecting that the vehicle engine is turned off). In this context, continuous recording and continuous retrieving may mean that sensor data 360 are repeatedly recorded and retrieved in pre-given time intervals. The sensor data 360 provided by the sensor unit 1020 comprises at least time data t and user position data p. In addition, the provided sensor data 360 may comprise vehicle motion data, such as vehicle speed v and vehicle accelerations a comprising also vehicle decelerations.

In principle, the retrieval of an initial start time $t_{start}$ and start position $p_{start}$ might be sufficient for predicting a route to be travelled (S310). For instance, when a start time $t_{start}$ and a corresponding start position $p_{start}$ is found to be identical to a previous start time $t_{previous}$ and previous start position $p_{previous}$ of one or more sensor data records stored in the sensor data database 370, it can be concluded—in the first instance—that the user is going to travel the route represented by the identified one or more sensor data records. The determining unit 1040 can then provide a first prediction of the intended route to be travelled on basis of a comparison of the stored map data with the one or more sensor data records having the same start time and start position. A prediction of a route to be travelled on the basis of a start time and start position may not be very reliable, when the start time or start position does not sufficiently correspond to the recorded start time or start position of previous route travels (for instance, when the start time for a specific route, like the daily way to work, is fluctuating). If there are deviations in the start time or start position, further sensor data 360 may be required (cf. loop "further sensor data required" in FIG. 3). In such a case, further position sensor data and, if available, vehicle motion data are additionally considered in order to reliable identify a stored sensor data record on which the route prediction can be based.

Generally, the amount of sensor data 360 available for the determining unit 1040 is continuously increasing during travel, since the sensor data 360 are recorded from the beginning of vehicle motion. As a consequence, the reliability of route prediction based on an increased sensor data set should also continuously increase. Thus, the determining unit 1040 may iteratively repeat the above described prediction procedure on basis of a continuously increasing sensor data set, until a reliable prediction for a repeatedly covered route can be made (Y-branch in FIG. 3). As a measure of reliability a confidence level ε of according to well known statistical methods can be additionally calculated for the predicted route. According to one variant a confidence level ε of 95% may be applied for determining a predicted route. According to another embodiment a lower confidence level ε may be already considered to be sufficient. According to still another embodiment, the navigation device 100 may prompt the user to confirm whether he is intending to drive the predicted route.

In case no route can be predicted on basis of the received sensor data 360, the method is stopped. In such a case, the already recorded sensor data and the sensor data for the remaining route portions are still recorded and stored in the database 1030 as new driving profile or sensor data record. The newly stored driving profile or sensor data record, in turn, can be used for future predictions.

If a predicted route could be determined the selecting unit 1050 starts with checking whether or not map data changes are available for the predicted route (step S320). For this purpose, the selecting unit 1050 searches for map data changes in the map data change database 372 of the navigation database. If no map data changes are available the selecting unit 1050 may also ask a map data change provider. If no map data changes are available the method is stopped (N branch). In case map data changes are found to be available for the predicted route, the selecting unit 1050 starts to retrieve the corresponding map data changes.

The retrieving step S330 may be accompanied by a data filtering (filter 1 in FIG. 3, reference 380). For instance, the retrieved data can be filtered according to its validity date and/or to its extraction date, provided that the map data changes are associated with a validity date and/or an extraction date. For instance, map data changes with an expired validity date are filtered out. In addition, map data changes with an extraction date older than a predetermined point in time may be also filtered out, since it can be assumed that the user is already aware of those changes so that a further warning would make no sense anymore.

A filtering in the map data change selecting step may be in particular beneficial for online map data change retrieval, since it ensures that only up-to-date changes that are interesting for the user are downloaded avoiding therefore unnecessary data traffic.

The retrieved map data changes are finally transferred to the generating unit 1070 which generates the warnings and instructions (step S340) on basis of the map data changes as discussed in conjunction with FIG. 2 above. The generated travel information may pass a second filter 390 (filter 2 in FIG. 3) that suppresses all those generated warnings and instructions that has been already outputted once or several times in the past. Generated warnings and/or instructions that have passed the second filter 390 are then outputted (S350). According to one implementation map data changes associated with warnings or instructions generated and outputted in the past may be marked as being already used. Based on the marking, the second filter may then suppress the outputting of warnings or instructions associated with map data changes already output in the past. In addition, or alternatively thereto, the second filter 390 may suppress all those warnings and instructions which the user has previously selected by a corresponding user input to be suppressed (for instance, in response to a corresponding prompt outputted by the navigation device 100).

Figure 4:
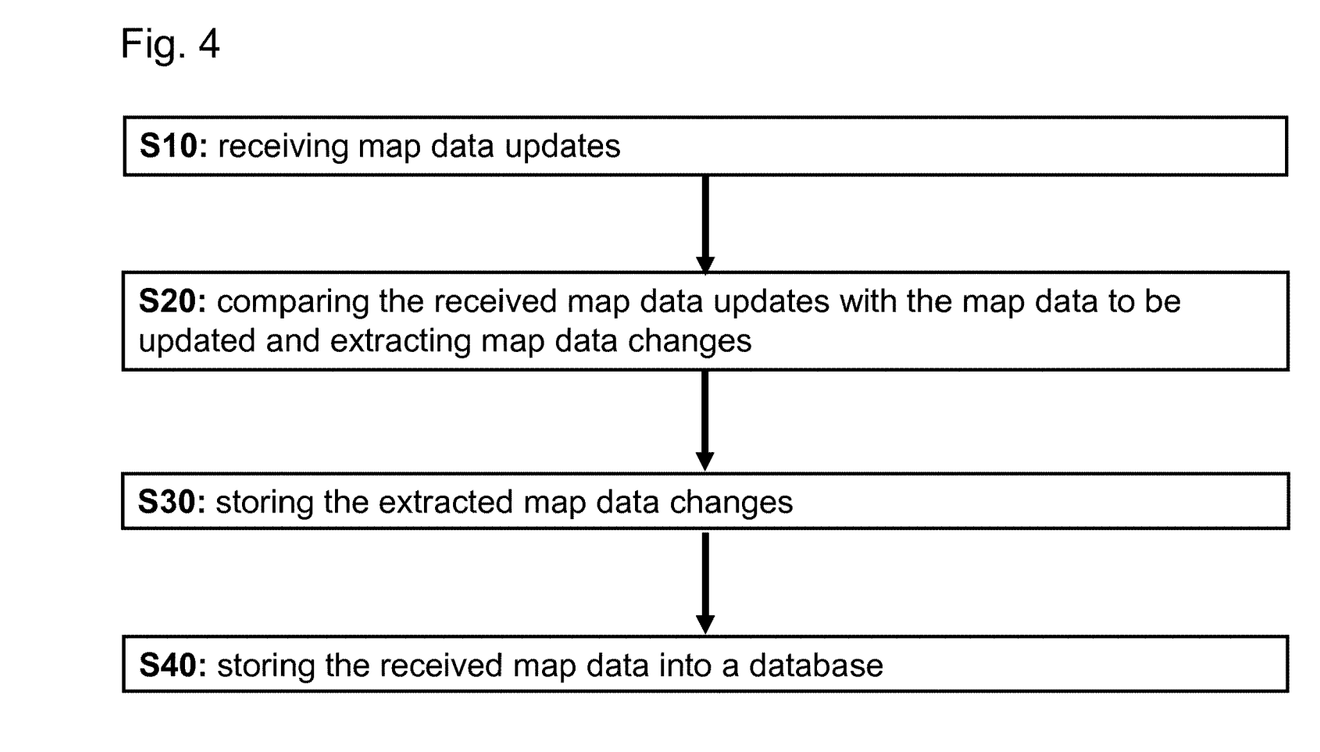
FIG. 4 illustrates a third flow diagram representing the method according to a further exemplary embodiment of the present invention.

The extraction of map data changes used for generating warnings or instructions indicative of changes in the traffic rules are described in more detail in conjunction with the flow diagram illustrated in FIG. 4. According to one variant the map data change extraction on basis of received map data updates is performed by the user navigation device. This variant is described in the following. The same extraction method can be also performed outside a navigation device, for instance at a map data change provider side.

The device 100 retrieves (via the interface 1080) map data updates from a map data provider and buffers the retrieved data in a buffer (S10). The buffer is not shown in FIG. 1. Upon receiving the map data updates, the extracting unit 1060 compares the retrieved update map data and the stored map data to be updated in the map database 1030 (S20) for deducing differences between the update data and the stored data. Differences that are found to represent map data error corrections (map data patches) rather than recent changes in the road network are filtered out. Such errors may comprise inaccurate digitalization of road courses, road junctions or junction connections or erroneous pro visioning of road attributes, traffic rules in previous map data versions.

Differences that are found to represent map data changes in the real road network are further considered. Such differences may at least comprise one of traffic rules, changed accessibility conditions of route segments, changed accessibility conditions of route nodes, changed trafficability conditions of route segments and changed POI data, and are generally described in the attribute data associated with route segments. Traffic rules may comprise at least one of speed limits, recommended average speeds, allowed travel directions and rights of way.

Based on the considered differences map data change information are extracted. The extracting step comprises generating map data change information indicative of how attribute data of route segments have been changed by the update data relative to previous version. For instance, in case a speed limit for a route segment has been changed from 70 km/h to 50 km/h, the map data change information does not only indicate that the new speed limit is 50 km/h, but rather that the speed limit has changed from 70 km/h to 50 km/h (i.e. the complete change information). The same also applies for other changed traffic rules, changed accessibility conditions of route segments and route nodes changed trafficability conditions of route segments and changed POI data.

In addition, the extracting step may further comprise generating filter parameters on basis of the provided update map data and attaching the filter parameters to the map data change information. For instance, if the map data supplier provides map data updates with validity dates, these validity dates can be additionally extracted and attached to the generated map data change information as a filter parameter. Still further, the extraction date can be provided and attached to the map data change information.

After extracting the map data change information the extracted map data change information is stored in the map data change database 372 of the navigation device 100 (S30). The map data change database 372 is organized as separate database being independent from the at least one database in which the map data are organized. Further, the buffered map data updates are then stored in the at least one map data database by overwriting the map data to be updated (S40).

Since the extracted map data changes comprise the full information of the attribute change, and are stored independent from the updated map database, instructions or warnings can be generated on basis of the map data change information which informs the user in detail about how traffic rules, accessibility conditions or POI data for the predicted route have been changed or will be changed in the near future. In contrast thereto, navigation devices which only use the updated map data, simply output—in the routing mode—maneuver instructions or provide a different route on basis of the new traffic rules (for instance, when a road is blocked by roadworks) without informing the user why the different actions have been performed.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the present invention be limited only by the scope of the claims appended hereto.

The invention claimed is:

1. A computer-implemented method for providing travel information for route segments repeatedly covered by a vehicle, wherein the travel information is indicative of map data changes extractable from map data update information, the method comprising:
   continuously recording position sensor data and motion sensor data, wherein the motion sensor data includes speed data and acceleration data;
   determining whether the vehicle is likely to travel along repeatedly covered route segments by comparing the recorded position sensor data with stored sensor data of previously travelled routes, comparing the recorded motion sensor data with the stored sensor data, and selecting the stored sensor data showing the highest accordance with the recorded sensor data as being sensor data of the route segments the vehicle is likely to travel;
   selecting map data changes that are associated with the repeatedly covered route segments the vehicle is likely to travel; and
   generating travel information on basis of the selected map data changes and providing the travel information to a driver,
   wherein the position sensor data and the motion sensor data are repeatedly recorded and retrieved in pre-given time intervals, and
   wherein the method is iteratively repeated until a repeatedly covered route is reliably predicted with a predetermined confidence level.

2. The method according to claim 1, wherein the method steps are performed during driving and while a route guidance is inactive.

3. The method according to claim 1, further comprising:
   receiving map data update information; and
   extracting map data changes from the received map data update information by comparing the received map data update information against map data information that is to be updated.

4. The method according to claim 1, further comprising receiving at least one of the map data changes and the map data update information via an air interface.

5. The method according to claim 1, wherein map data changes are extracted in accordance with one or more filtering conditions.

6. The method according to claim 1, wherein each map data change is provided with an extraction date.

7. The method according to claim 6, wherein the selecting step further comprises filtering map data changes having an extraction date older than a predetermined point in time.

8. The method according claim 1, wherein the determining step further comprises evaluating at least one of detected position data and detected driving condition data in order to determine the current position and the upcoming route segments the vehicle is likely to travel.

9. The method according to claim 1, further comprising suppressing the travel information generation for route segments in the case that the travel information was already provided to the driver at least once during at least one previous travel along the route segments.

10. The method according to claim 1, wherein the map data changes comprise at least one of changed traffic rules, changed accessibility conditions of route segments and changed POI data.

11. The method according to claim 1, further comprising providing each map data change with a validity date indicating the temporal validity of the change.

12. The method according to claim 11, wherein the selecting step comprises filtering map data changes in accordance with their validity dates.

13. A non-transitory computer-readable recording medium storing a computer program product comprising program code portions for performing the steps of one of claim 1 to 5, 6 to 10, 11 or 12.

14. An electronic device configured to provide travel information for route segments repeatedly covered by a vehicle, wherein the travel information is indicative of map data changes extractable from map data update information, wherein the device comprises:
- a sensor adapted to continuously record position sensor data and motion sensor data, wherein the motion sensor data includes speed data and acceleration data;
- a processor configured to determine that the vehicle is likely to travel along repeatedly covered route segments by comparing the recorded position sensor data with stored sensor data of previously travelled routes, comparing the recorded motion sensor data with the stored sensor data, and selecting the stored sensor data showing the highest accordance with the recorded sensor data as being sensor data of the route segments the vehicle is likely to travel;
- the processor configured to select map data changes that are associated with the repeatedly covered route segments the vehicle is likely to travel; and
- the processor configured to generate travel information on basis of the selected map data changes and to provide the travel information to a driver,
- wherein the position sensor data and the motion sensor data are repeatedly recorded and retrieved in pre-given time intervals, and
- wherein the processor iteratively repeats until a repeatedly covered route is reliably predicted with a predetermined confidence level.

15. The device of claim 14, further comprising a storage unit comprising at least one of a map database in which updatable map data are stored and a database in which extracted map data changes are stored.

16. The device of claim 14, further comprising the processor configured to extract map data changes from received updated map data by comparing the updated map data against map data information that is to be updated.

17. A navigation device comprising the device of one of the preceding claims 14 to 16.

* * * * *